(12) United States Patent
Moody

(10) Patent No.: US 6,463,878 B1
(45) Date of Patent: Oct. 15, 2002

(54) BIRD FEEDER APPARATUS-TO DETER CRAWLING INSECT ENCROACHMENT

(76) Inventor: Paula S. Moody, P.O. Box 33, Broken Arrow, OK (US) 74013

( * ) Notice: Subject to any disclaimer, the term of this patent is extended or adjusted under 35 U.S.C. 154(b) by 0 days.

(21) Appl. No.: 09/992,293

(22) Filed: Nov. 14, 2001

(51) Int. Cl.[7] .......................... A01K 61/02; A01K 5/00
(52) U.S. Cl. ..................... 119/57.9; 119/61; 119/52.3
(58) Field of Search ................... 119/51.5, 52.3, 119/57.9, 61, 72

(56) References Cited

U.S. PATENT DOCUMENTS

| | | | |
|---|---|---|---|
| 2,584,301 A | | 5/1952 | Sinclair ................... 119/61 |
| 4,207,839 A | * | 6/1980 | Barry .................... 119/57.9 |
| 4,323,035 A | | 4/1982 | Piltch ...................... 119/51 |
| 4,441,457 A | | 4/1984 | Sanford ................... 119/51 |
| 4,441,458 A | | 4/1984 | Mercil ..................... 119/51 |
| 4,691,665 A | | 9/1987 | Hefner .................... 119/77 |
| 4,896,627 A | | 1/1990 | Riddell ................. 119/51.5 |
| 5,005,524 A | * | 4/1991 | Berry ...................... 119/61 |
| 5,069,166 A | * | 12/1991 | Ahuna ..................... 119/61 |
| 5,377,617 A | | 1/1995 | Harwich ................. 119/6.5 |
| 5,467,735 A | | 11/1995 | Chrisco ................ 119/51.5 |
| 5,507,249 A | | 4/1996 | Shaw ...................... 119/72 |
| 5,632,228 A | | 5/1997 | Ybarra .................. 119/51.5 |
| 5,730,082 A | | 3/1998 | Newman ............... 119/51.5 |
| 5,775,255 A | | 7/1998 | Louviere, III .......... 119/51.5 |
| 5,829,384 A | * | 11/1998 | Landry ................. 119/52.3 |
| 5,979,360 A | | 11/1999 | Tharp ................... 119/51.5 |
| 6,155,205 A | * | 12/2000 | Coates .................. 119/57.9 |
| 6,167,840 B1 | * | 1/2001 | White et al. .............. 119/61 |

* cited by examiner

Primary Examiner—Charles T. Jordan
Assistant Examiner—Elizabeth Shaw
(74) Attorney, Agent, or Firm—Head, Johnson and Kachigian

(57) ABSTRACT

An improved bird feeder, usually supplied with nectar, or other insect attracting food source is suspended below an apparatus containing liquid in a moat like structure. The apparatus provides for an upper portion which may be removably attached to a lower portion. The lower portion's bottom edge terminates in an upward direction within the internal section of the lower portion to form a moat like channel. Water, gel or another insect trapping substance, is placed in the moat to prevent insects from crawling further in a first direction in an attempt to reach the feeder. The apparatus surrounds a suspending element with an opening sufficiently large to prevent insects from reaching the suspending element when traveling in a second direction.

10 Claims, 2 Drawing Sheets

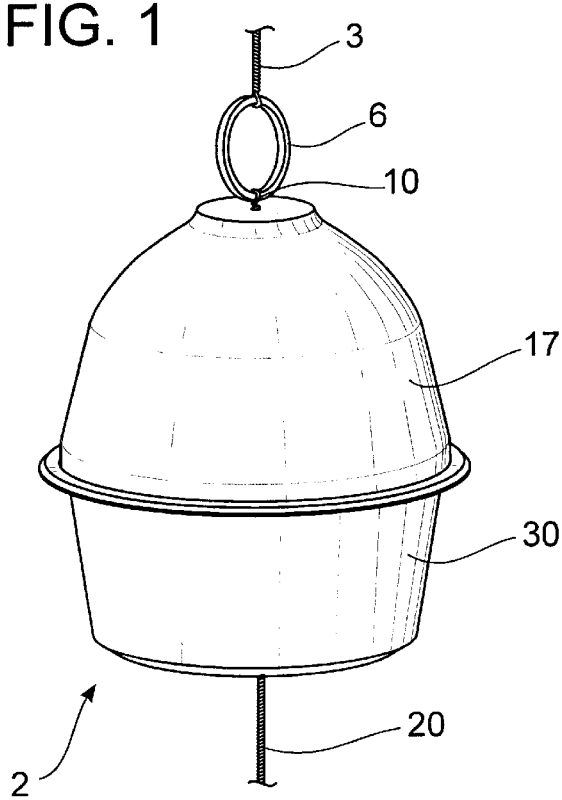
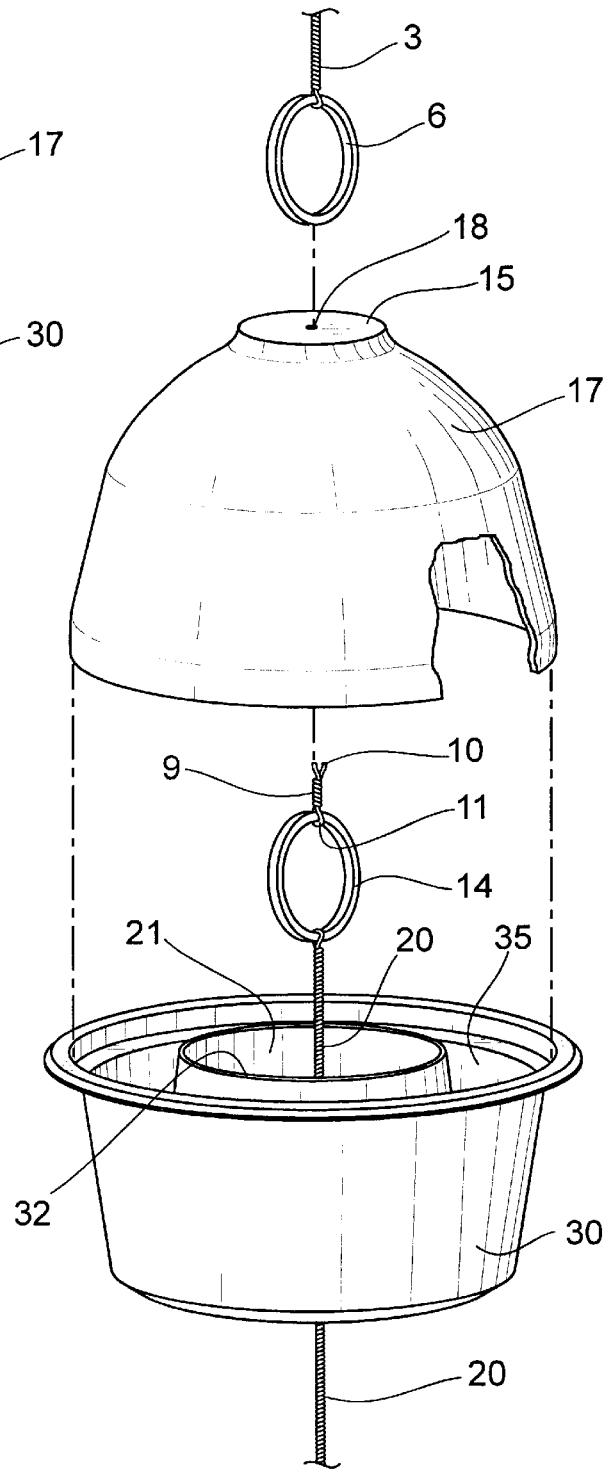

BIRD FEEDER APPARATUS-TO DETER CRAWLING INSECT ENCROACHMENT

REFERENCE TO PENDING APPLICATIONS

This application is not related to any other pending applications.

REFERENCE TO MICROFICHE APPENDIX

This application is not referenced in any microfiche appendix.

TECHNICAL FILED OF THE INVENTION

The invention relates generally to the field of bird feeders and, more particularly, to an apparatus which dissuades and avoids encroachment of crawling insects upon a insect attracting liquified, gel, solidified or granulated food source.

BACKGROUND OF THE INVENTION

Bird feeders are typically suspended from a branch, building or specially constructed stand by a wire or string in order to allow birds, such as hummingbirds, to view the feeder before approaching. Ants and other crawling insects typically find their way to the feeder's connection point and then follow the wire or string to the feeder with the feeder soon covered with insects.

Examples of prior art feeders intended thwart such insect encroachment are shown in U.S. Patents including U. S. Pat. No. 4,901,673 issued Feb. 20, 1990 to Overstreet purportedly disclosing a feeder with a nectar reservoir including an area at the top for storing insect inhibiting oil. U.S. Pat. No. 5,247,904 issued Sep. 28, 1993 to Anderson purportedly disclosing a hummingbird feeder including an area for storing a quantity of fluid around a main support post. U.S. Pat. No. Des. issued for hummingbird feeders include; U.S. Pat. No. Des. 252,288 issued Jul. 3, 1979 to Kilhar, U.S. Pat. No. Des. 287,652 issued Jan. 6, 1987 to Mack and U.S. Pat. No. Des. 333,538 issued Feb. 23, 1993 to Kingsley.

The prior fails to anticipate the hummingbird feeder as disclosed and claimed herein.

BRIEF SUMMARY OF THE INVENTION

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

In this respect, before explaining at least one embodiment of the invention in detail, it is to be understood that the invention is not limited in this application to the details of construction and to the arrangement so the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

The invention is drawn to a bird feeder, usually supplied with nectar, or other insect attracting food source is suspended below an apparatus containing liquid in a moat like structure. The apparatus provides for an upper portion which may be removably attached to a lower portion. The lower portion's bottom edge terminates in an upward direction within the internal section of the lower portion to form a moat like channel. Water, gel or another insect trapping substance, is placed in the moat to prevent insects from crawling further in a first direction in an attempt to reach the feeder. The apparatus container necessarily surrounds a suspending element with an opening sufficiently large to prevent insects from reaching the suspending element when traveling in a second direction.

A broad object of the invention is to provide an improved apparatus which may be used in conjunction with a bird feeder to prevent ants and other insects from crawling onto the feeder.

A more specific object is to provide a bird feeder with an apparatus which deters or precludes crawling insect encroachment and a means for suspending the feeder from an overhead support, wherein:

(1) A bird feeder usually supplied with nectar, or other insect attracting food source is suspended below an apparatus containing liquid in a moat like structure.

(2) The apparatus provides for an upper portion which may be removably attached to a lower portion.

(3) The lower portion's bottom edge terminates in an upward direction within the portion's internal section to form a moat like channel which may contain water, gel or another insect trapping substance.

(4) Water, gel or another insect trapping substance once placed in the moat prevents insects from crawling further in a first direction in an attempt reach the feeder.

(5) The apparatus necessarily surrounds an element suspending the feeder with an opening sufficiently large to prevent insects from "bridging" or otherwise reaching the suspending element when traveling in a second direction.

(6) Having terminated the travel of crawling insects in a first direction, or precluded travel in a second direction, encourages potential of travel in a third direction which avoids encroachment upon the bird feeder.

(7) The apparatus is so shaped and constructed as to prevent or discourage birds from drinking therefrom. These and other advantages, features and objects of the invention will become more apparent from the following description taken in connection with the illustrative embodiment in the accompanying drawings.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference would be had to the accompanying drawings, depictions and descriptive matter in which there is illustrated preferred embodiments and results of the invention.

Additional objects and advantages of the invention are set forth, in part, in the description which follows and, in part, will be apparent to one of ordinary skill in the art from the description and/or from the practice of the invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference would be had to the accompanying drawings, depictions and descriptive matter in which there is illustrated preferred embodiments and results of the invention.

DESCRIPTION OF THE DRAWINGS

FIG. 1 is a environmental view of the invention in perspective.

FIG. 2 is a side elevation view of the invention.

DETAILED DESCRIPTION OF THE PREFERRED EMBODIMENT

Figure 3:
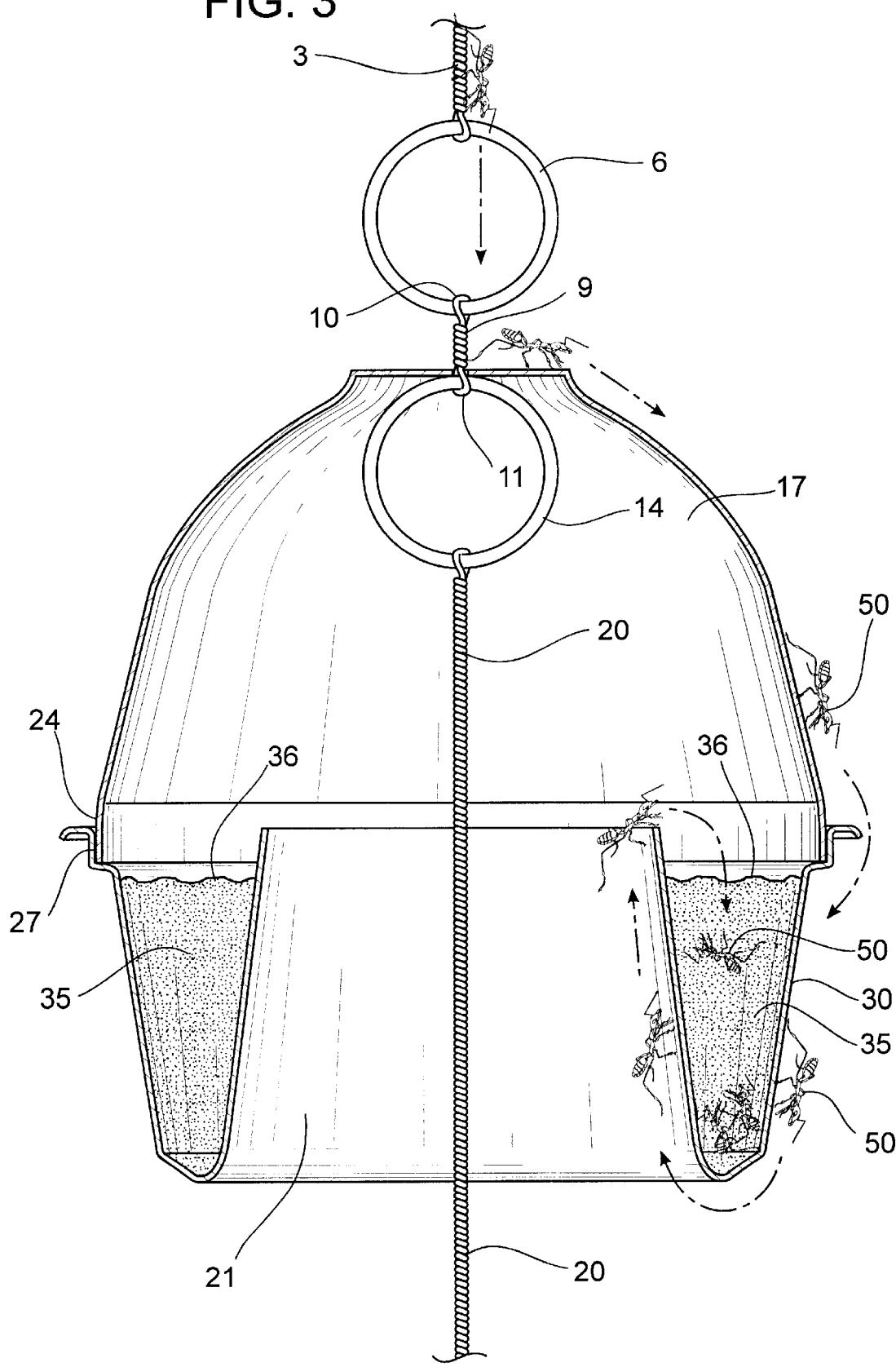
FIG. 3 is a cross sectional view of the invention.

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant. While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

FIG. 1 illustrates an environmental view of the invention in perspective. Turning now to FIG. 1.

In FIG. 1 the apparatus 2 of the instant invention is shown illustrating an apparatus suspending element 3 attached to a first connection structure 6. The suspending element 6 of the instant invention may be a rope, chain, wire, or other suspending means typically employed in association with affixing or otherwise attaching bird feeders to trees, bird feeder stands, or other similarly functioning structures. The first connection structure 6 is shown as a ring like structure. However, it is clearly envisioned other connection structures allowing for one or more elements to be attached thereto may be proposed in connection with the invention's practice. Also attached to the first connection structure 6 is shown a first end 10 of a swivel component (not shown in FIG. 1). The first end 10 of the swivel component will be further illustrated and discussed in detail in association with FIGS. 2 and 3. As shown in FIG. 1, the apparatus of the instant invention 2 is illustrated showing an upper component 17 sealably attached to a lower component 30. In practice, it has been shown that the upper and lower components (17, 30) may be embodied as distinct structures which snap or otherwise form-fit together. However, in testing it has been shown that a molded one piece structure general upper and lower sections (17, 30) with said lower section #) accommodating a moat like channel in its internal portion would allow the invention's practice equally well. FIG. 2 provides for a side elevation view of the instant invention. Turning now to FIG. 2.

In FIG. 2, the apparatus suspending element 3 is again shown connected to a first connection structure 6. A swivel component 9 is shown having a first end 10 and a second end 11. As discussed in association with FIG. 1, the first end 10 of the swivel component 9 is attached to a first connection structure 6. In so doing, it is clear the swivel component of the instant invention extends above, through, and below the upper most surface 15 of the upper component 17. An aperture 18 located generally in the center most point of said upper surface 15 facilitates the passage therethrough of said swivel component 9. FIG. 2 further illustrates a second end 11 of said swivel component 9 attaching to a second connection structure 14. Also attached to said second connection structure 14 is a bird feeder suspending element 20 which extends from said second connection structure 16 through a feeder opening 21, attaching thereto a bird feeder containing a food source such as nectar (bird feeder not shown). In FIG. 2, the lower portion 30 of the instant invention is shown having a bottom edge 32 which terminates in an upper direction forming a moat like channel 35 within the inner portion of said lower component 30.

FIG. 3 illustrates a detailed cross sectional view of the instant invention wherein the moat like channel 35 may be better observed and appreciated. Turning now to FIG. 3.

In FIG. 3 the instant invention's upper component 17 is shown sealably attached to its lower component 30. As illustrated in FIG. 3, this sealable attachment is shown as a snapping, or otherwise, form fitting means wherein said upper component 17 has an appropriately dimension lower edge 24 fitting into an appropriately dimensioned resilient clipping means 27. Following initial construction, circumferential elements 24 and 27 may be heat sealed, plastic wrapped, or otherwise bonded to form a leak proof bond thereby allowing the moat like channel 35 of the instant invention to extend in an upward direction beyond the lower lid portion 24 of said upper component 17. Said further extension allowing for additional fluid 36 to be maintained within said moat like channel 35. FIG. 3 also illustrates the typical path followed by an ant or other crawling insect when attempting to reach a food source contained within a bird feeding structure. Such crawling insects typically first encounter the instant invention by locating the first suspending element 3 descending downward therefrom and onto the upper portion 17 of the instant invention. Continuing downward, said ants 50 reach the bottom most area of the invention's second component 30, and as ascend vertically in an attempt to locate a path by which they may encroach upon, a bird feeder attached to suspending element 20 (not shown). The apparatus of the instant invention necessarily surrounds the feeder suspending element 20 with an opening 21 sufficiently large to prevent insects from bridging, or otherwise reaching the feeder suspending element 20 when traveling in a first direction. When traveling in a second direction, water, gel, or another insect trapping substance 36 is placed in the moat 35 of the instant invention, terminating abruptly said insects seemed direction of travel. Consequently, crawling insects having failed to travel in either first or second direction, are left no alternative than to retrace their steps and vacate the immediate area of the instant invention.

Upon reviewing FIGS. 1–3, it can be readily appreciated and easily envisioned that an alternative embodiment of the instant invention may be had simply by eliminating the first connection structure 6 and swivel component 9, allowing for the apparatus suspending means 3 to connect directly to the second connection structure 14. It is equally appreciated and envisioned that the apparatus of the instant invention may be form molded so as to preclude necessity for separate upper component 17 and lower component 30. However, it has been shown through extensive testing that the embodiments indicated by FIGS. 1–3 reflect a preferred embodiment resulting in improved efficiency, flexibility of design, and ease of handling.

It will be apparent to those skilled in the art that various modifications and variations can be made in the construction, configuration, and/or operation of the present invention without departing from the scope or spirit of the invention. For example, in the embodiments mentioned above, variations in the materials used to make each element of the invention may vary without departing from the scope of the invention. Thus, it is intended that the present invention cover the modifications and variations of the invention provided they come within the scope of the appended claims and their equivalents.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus used in association with a bird feeder to deter crawling insects from encroaching upon said apparatus comprising:

an upper dome shaped portion removably attached to a lower portion, said lower portion's bottom edge terminating in an upward direction within the inner portion of said lower portion to form a moat like channel for containing fluid; and a swivel component having first and second ends extending above, through and below the upper most portion of said upper portion.

2. The apparatus of claim 1 wherein said swivel's first and second ends are each respectively attached to first and second connection structures.

3. The apparatus of claim 1 wherein said first connection structure is also attached to an apparatus suspension means.

4. The apparatus of claim 1 wherein said second connection structure is also attached to a bird feeder connection means.

5. The apparatus of claim 1 wherein said upper portion and said lower portion are sealably attached.

6. The apparatus of claim 1 wherein said upper portion and said lower portion are sealably attached.

7. The apparatus of claim 1 wherein said upper portion and said lower portion are sections of a singularly pieced structure.

8. An apparatus used in association with a bird feeder to deter crawling insects from encroaching upon said apparatus comprising:

an upper portion removably attached to a lower portion, said lower portion's bottom edge terminating in an upward direction within the inner portion of said lower portion to form a moat like channel for containing fluid;

a swivel component having first and second ends extending above, through and below the upper most portion of said upper portion;

first and second connection structures attached respectively to said swivel's first and second ends; an apparatus suspension means additional attached to said first connection structure; and, a bird feeder connection means attached to said second connection structure.

9. The apparatus of claim 8 wherein said upper portion and said lower portion are sealably attached.

10. The apparatus of claim 9 wherein said upper portion and said lower portion are sections of a singularly pieced molded structure.

* * * * *